United States Patent [19]

Carpenter

[11] Patent Number: 4,474,721
[45] Date of Patent: Oct. 2, 1984

[54] APPARATUS FOR FORMING THREADS AND FILAMENTS OF FLUOROCARBON RESIN AND METHOD THEREOF

[75] Inventor: Robert E. Carpenter, Nutley, N.J.
[73] Assignee: Chemplast, Inc., Wayne, N.J.
[21] Appl. No.: 470,396
[22] Filed: Feb. 28, 1983
[51] Int. Cl.³ .............................................. B29D 7/18
[52] U.S. Cl. .................... 264/157; 264/158; 425/66; 425/306; 82/47; 82/48
[58] Field of Search .................. 29/4.5 A, 4.5 R; 82/1 C, 13, 46, 47; 264/127, 157, 158; 425/66, 289, 306

[56] References Cited

U.S. PATENT DOCUMENTS

| | | | |
|---|---|---|---|
| 1,899,608 | 2/1933 | Bullard | 82/1 C |
| 3,355,971 | 12/1967 | Vigor | 82/47 |
| 3,820,420 | 6/1974 | Matthews | 82/46 |
| 4,025,598 | 5/1977 | Sasshofer et al. | 264/157 |

FOREIGN PATENT DOCUMENTS 2055067  2/1981  United Kingdom ............... 82/47 X Primary Examiner—Donald E. Czaja
Assistant Examiner—Virginia Fischbach
Attorney, Agent, or Firm—Daniel H. Bobis

[57] ABSTRACT

An apparatus for forming and producing elongated threads or filaments of synthetic material such as fluorocarbon resins which can be used to form yarns utilizes, a turning machine having, a chuck assembly for mounting a billet of the fluorocarbon resin material therein, and a lead screw assembly with a tool holder assembly thereon. The lead screw assembly is disposed to move a cutting tool in the tool holder assembly longitudinally and parallel to the axes of rotation of the billet so that a plurality of cutting edges on the end cutting face of the cutting tool can cut simultaneously from the billet a corresponding plurality of sized, shaped and dimensioned threads or filaments which can be combined and formed into the desired yarn. Means are provided to synchronize the movement of the cutting tool with the rotation of the fluorocarbon resin billet.

Additionally, the apparatus and method as above described wherein a plurality of spaced cutting tools are disposed for simultaneous engagement of the billet each adapted to cut threads or filaments therefrom.

21 Claims, 24 Drawing Figures

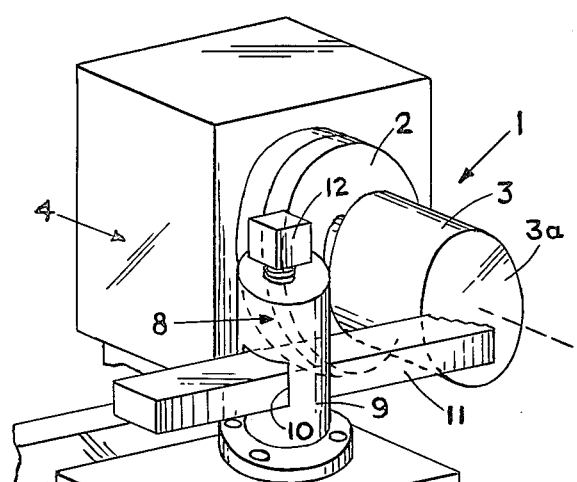
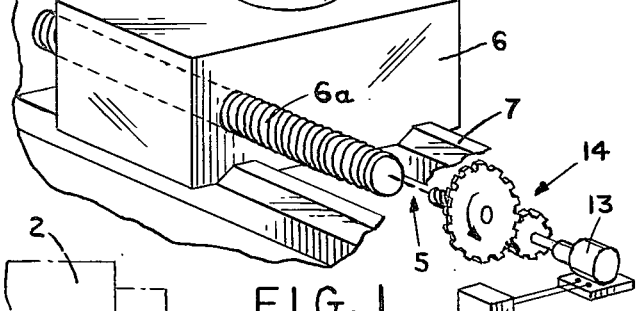
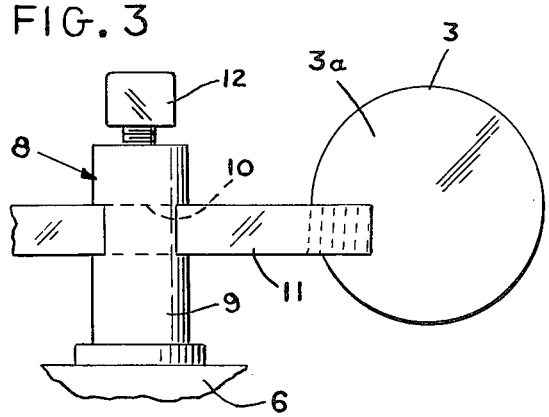
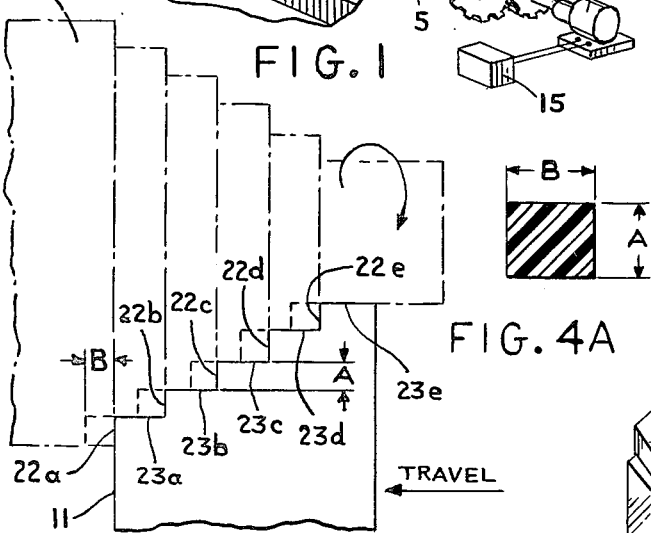
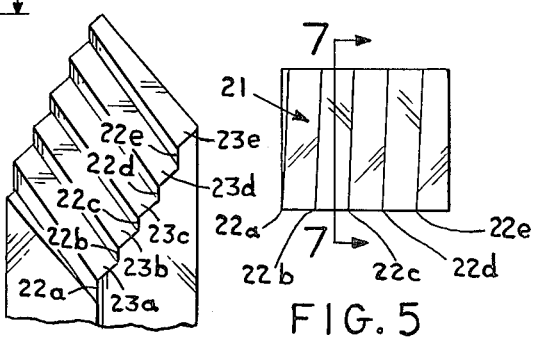
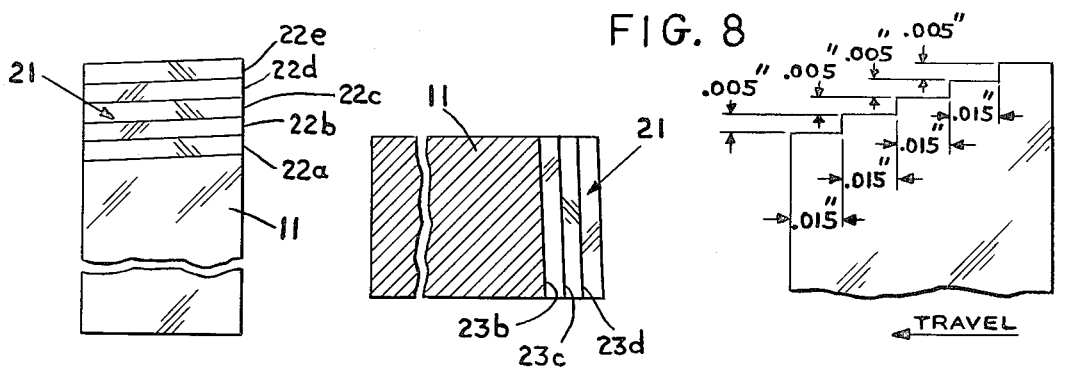

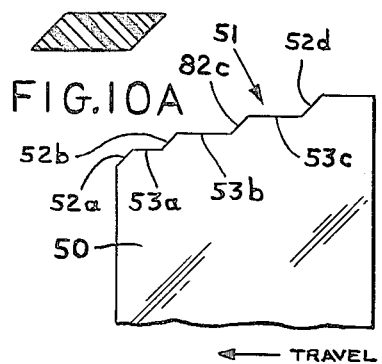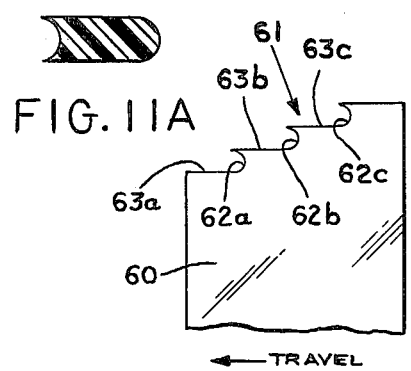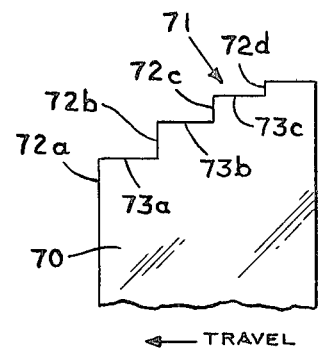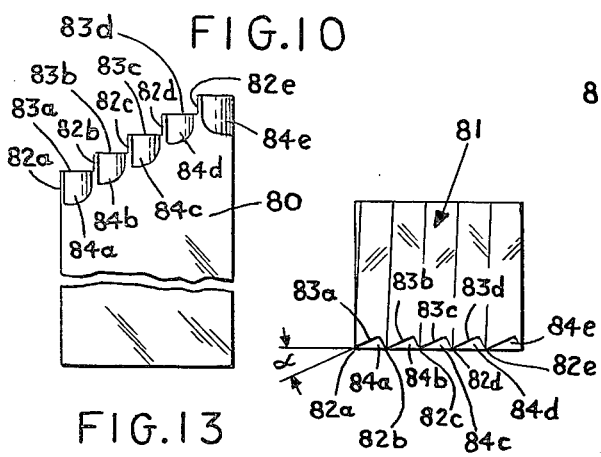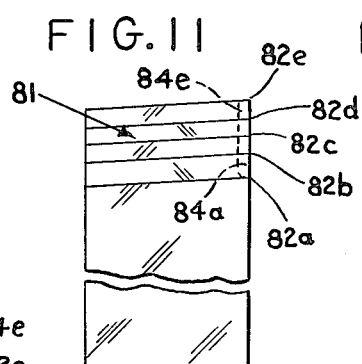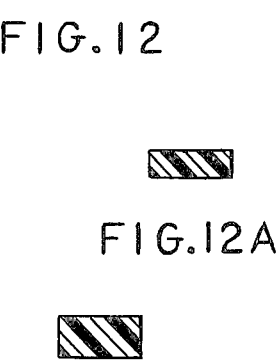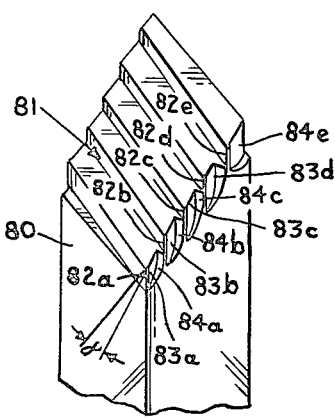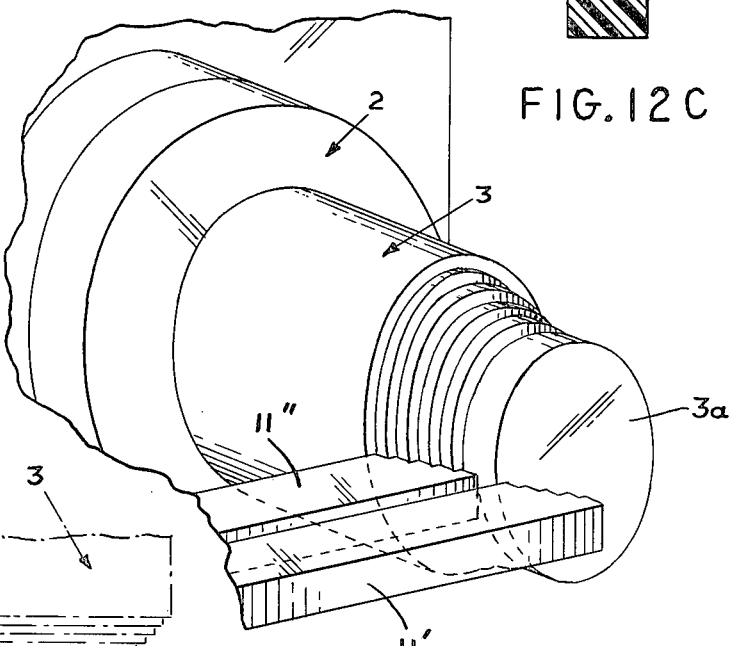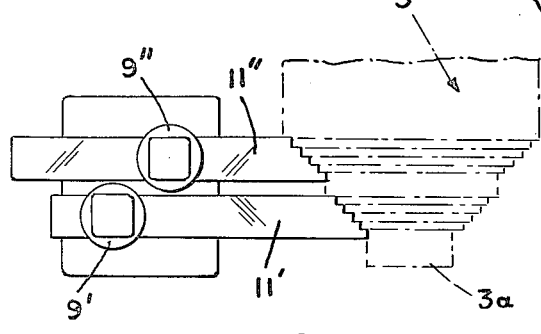

APPARATUS FOR FORMING THREADS AND FILAMENTS OF FLUOROCARBON RESIN AND METHOD THEREOF

BACKGROUND OF THE INVENTION

This invention relates generally to an apparatus for forming and producing filaments or elongated strands of synthetic material such as fluorocarbon resins that can be used to form yarns which can be woven, knitted, braided or otherwise combined to provide a plurality of products adapted to improve service and life for many conventional applications.

It is well known that fluorocarbon resin fibers and filament such as polytetrafluoroethylene (PTFE); fluoroethylene propylene (FEP) and other polymers and co-polymers are adapted and have been used to form woven and knitted materials because of the chemical and physical properties of such fluorocarbon resins in that they are chemically inert, heat and corrosion resistant, easy to clean, and have a built in lubricity.

For a more detailed discussion of the properties and applications of fluorocarbon resin fibers and filaments reference is herein made to the publication entitled Du Pont Technical Information - Fibers - Bulletin T-13 dated March 1970 which is incorporated herein by reference.

In this Bulletin, it is shown that PTFE fibers and filaments in woven, knitted and braded forms are widely used in many industrial applications and in products where the desirable chemical and physical characteristics of these materials act to improve the function thereof.

For example the woven, knitted and braided materials made from fluorocarbon resin filaments or elongated strands are used for all types of clothing, for filter bags and filtering cloths, at industrial and commercial sites where there are chemical processes, chemicals or waste material of a highly corrosive nature and/or corrosive hot gases or hot liquids; and for applications such as woven self-lubricated bearings; for braided packing, for lacing cord and other electronic industry applications; and for many medical uses.

Various methods for producing PTFE fibers, filaments and elongated strands for making articles are known in the prior art. For many years the making of such articles followed the practices of the textile industries in that the yarns have been made from fibers which are obtained from dispersions of fluorocarbon resins. More recently mechanical techniques have been developed utilizing foil slitting wherein a thin layer of PTFE is skived from a billet of the same material and the layer is then slit into threads or filament by means of suitable slitting jigs. For example one technique of this type is shown in U.S. Pat. No. 2,728,950.

In U.S. Pat. No. 4,025,598 another mechanical method for forming threads, elongated strands, or filaments of PTFE is shown in which the surface of a billet of PTFE being rotated is deformed by a jig to form a plurality of grooves and ridges and then a skiving knife is applied to cut the ridges off to form the desired filament. The filament can be as long as desired and can be drawn off heated and stretched and combined with other filaments to form a conventional multi-filament yarn which can then be utilized to form the woven, knitted or braided material.

The present invention is directed to an improved apparatus for the mechanical forming of PTFE filaments or elongated strands wherein a rotating billet of PTFE is engaged by a cutting tool having a plurality of sized offset cutting edges so that a plurality of separate sized and shaped filaments of PTFE can be simultaneously cut in continuous lengths so that the filaments can be drawn off, joined and stretched in accordance with conventional techniques to form yarns of various thickness.

The broad method of making filaments or elongated strands of fluorocarbon resin in accordance with the present invention permits a variety of techniques and variations to provide a desired shape and size for the filaments as is more fully described hereinafter. Further however it will be understood by those skilled in the art that while this apparatus and method is shown as applied to a billet of fluorocarbon resin material that it is equally appli-cable to other ductile materials such as steel, copper or aluminum. Waste is minimized compared with other methods for producing plastic filaments or "METAL WOOLS".

Further the present apparatus and method can be applied to a simple compression molded billet of fluorocarbon resin which is a cheaper raw material then the raw materials now used in the prior art for making the fluorocarbon fibers to provide the desired yarn for forming the woven, knitted or braided materials of fluorocarbon resin.

The strands or filaments obtained by the method and apparatus of the present invention can be used as cut from the fluorocarbon resin billet or they can be moderately or highly oriented to alter their physical characteristics by calendering or stretching at room or elevated temperatures. Further, because of the versatility of the present apparatus and method the actual dimensions of the filaments or elongated strands can be varied over a wide range by adjusting the pitch and depth of cut of the cutting device for establishing the desired cross-section for the respective filament or elongated strands of fluorocarbon resin.

SUMMARY OF THE INVENTION

Thus the present invention covers an apparatus for forming elongated threads or filaments of synthetic material such as fluorocarbon resin from a billet thereof comprising, a turning machine having, a chuck assembly mounted for rotation therein about a fixed axis, driving means for rotating the chuck assembly, at least one sized billet of synthetic material fixedly mounted in said chuck for rotation therewith when the driving means is placed in operation, a tool holder assembly operatively connected on the turning machine for longitudinal movement at a predetermined rate parallel to the axis of rotation of the chuck assembly and the billet connected therein, and means to adjust said tool holder assembly towards and away from the axis of rotation of said billet, a cutting tool fixedly mounted in and movable with the tool holder assembly to engage and cut into said rotating billet, and said cutting tool having a shaped cutting face with at least two offset cutting edges thereon whereby a plurality of sized and shaped threads and filaments are cut from the billet simultaneously.

Additionally the apparatus as above described wherein the longitudinal motion of the tool holder assembly parallel to the fixed axis of rotation for the chuck assembly is synchronized by means of a gear train with the rotation of the chuck and billet to produce a thread or filament of constant cross-section.

Additionally the apparatus as above described in combination with a micro-processor for controlling the rate of longitudinal motion of the tool holder assembly parallel to the fixed axis of rotation for the chuck assembly to produce a thread or filament of varying cross-section.

Accordingly it is an object of the present invention to provide an improved apparatus for making elongated threads and filaments of synthetic material of uniform shape and size.

It is another object of the present invention to provide an improved apparatus for making elongated threads and filaments which is relatively simple and reliable and which can produce threads and filaments of varying shapes and sizes.

It is another object of the present invention to provide an improved apparatus for mechanically forming a plurality of elongated threads and filaments simultaneously from a billet of synthetic material such as fluorocarbon resin.

It is another object of the present invention to provide an improved apparatus for mechanically forming a plurality of elongated threads or filaments simultaneously from a billet of synthetic material such as fluorocarbon resin wherein the shape, size and dimension of each of said plurality of elongated threads or filaments can be easily controlled and varied as may be required.

With these and other objects and advantages the invention will be better understood by reference to the description which follows with reference to the accompanying drawings, in which:

BRIEF DESCRIPTION OF THE FIGURES

FIG. 1 is a diagramatic perspective view of a turning machine with a lead screw, showing a billet of synthetic material such as fluorocarbon resin held in the chuck assembly thereon, and showing one form of tool holder assembly and a cutting tool in operative association therewith in the initial cutting position to begin forming the elongated threads and filaments, all in accordance with the present invention.

FIG. 2 is an enlarged end view of the billet and cutting tool in the initial position as shown in FIG. 1.

FIG. 3 is an enlarged perspective view of a fragment of the billet and cutting tool shown in FIG. 1 wherein all of the cutting edges of the tool are in engagement with the rotating billet and the plurality of elongated threads or filaments are being simultaneously formed.

FIG. 4 is a top view of the cutting tool in cutting engagement with the billet as shown in FIG. 3 showing in phantomized lines the cutting tool advancing into the billet during the cutting of the elongated threads and filaments as shown in FIG. 3.

FIG. 4A is an enlarged cross-section of an elongated thread or filament as formed and cut by one of the cutting sections of the cutting tool shown in FIG. 4.

FIG. 5 is an end view of the offset cutting faces shown in FIGS. 1 to 4 of the drawings.

FIG. 6 is a left side view of the cutting tool shown in FIGS. 1 to 4 of the drawings.

FIG. 7 is a vertical section taken on line 7—7 of FIG. 5.

FIG. 8 is an enlarged perspective view of the offset cutting face of the cutting tool shown in FIGS. 1 to 6 of the drawings.

FIG. 9 is an enlarged top view of the cutting end of the tool shown in FIGS. 1 to 8 having dimensions illustrated thereon for forming an elongated thread or filament which is generally rectangular in cross-section and wherein the length and width dimensions for the cross-section are 0.005"×0.015".

FIG. 10 shows another form of cutting tool having shaped cutting edges for forming elongated threads or filaments which have a cross-section in rhomboid form.

FIG. 10A is an enlarged cross-section of the rhomboid form of elongated thread or filament formed and cut by the cutting tool shown in FIG. 10.

FIG. 11 shows another form of cutting tool with shaped cutting edges to provide elongated threads and filaments having at least two parallel curved faces.

FIG. 11 A is an enlarged cross-section of the elongated thread or filament formed and cut by the cutting tool shown in FIG. 11.

FIG. 12 shows another form of cutting tool with shaped cutting edges to provide elongated threads and filaments which vary in at least one dimension from the next adjacent thread or filament cut by these cutting edges.

FIGS. 12A, 12B, and 12C are respectively enlarged cross-sections of the variations of the elongated threads or filaments cut with the respective cutting edges of the tool shown in FIG. 12.

FIG. 13 is a top view of still another form of cutting tool having a further modified set of cutting edges or sections to permit increasing the surface speed of the billet of ductile material when cutting elongated threads or filaments therefrom having relatively large cross-sectional areas.

FIG. 14 is an end view of the offset cutting face of the cutting tool shown in FIG. 13.

FIG. 15 is a left side view of the cutting tool shown in FIG. 13.

FIG. 16 is an enlarged perspective view of the offset cutting face of the cutting tool shown in FIGS. 13 to 15 of the drawings.

FIG. 17 is a schematic fragmentary perspective view showing a billet of synthetic material such as fluorocarbon resin held in the chuck assembly thereon and showing at least two spaced cutting tools disposed in the initial cutting position to begin forming the elongated threads and filaments all in accordance with this modified form of the present invention.

FIG. 18 is a view of a fragment of the billet and the spaced cutting tools shown in FIG. 8 wherein all the cutting edges of each of the respective cutting tools are in engagement with the rotating billet so that the plurality of elongated threads or filaments can be simultaneously formed by each of the respective cutting tools.

The present invention contemplates a method of forming elongated threads and filaments from a billet of ductile synthetic material such as flurocarbon resin in accordance with the following steps:

a. Mounting said billet of synthetic material for rotation about a fixed axis, b. moving a cutting tool longitudinally and parallel to the axis of rotation of said billet and into engagement with the peripheral face of the billet as it is being rotated, c. said cutting tool having a plurality of shaped and sized cutting edges thereon to simultaneously cut a plurality of shaped, sized and dimensioned elongated threads or filaments from the billet when the tool is moved into engagement therewith, and d. synchronizing the longitudinal movement of the cutting tool with the rotation of the billet to produce a fiber of constant cross-section.

The method of the present invention also contemplate varying the cutting edges of the cutting tool to vary the shape, size and dimension of each of the plurality of elongated threads or filaments which are simultaneously cut from the billet of synthetic material, and varying the number of cutting tools with the above mentioned different cutting edges.

Alternatively the method of the present invention contemplates adjusting the longitudinal movement of the cutting tool by a micro-processor to provide threads or filaments of varying cross-sectional widths.

DESCRIPTION OF THE INVENTION

Referring to the drawings FIG. 1 shows diagrammatically a turning machine such as a screw cutting engine lathe generally designated 1 having a chuck assembly 2 mounted thereon for holding and rotating a billet 3 of ductile synthetic material such as fluorocarbon resin.

A screw cutting engine lathe with a chuck assembly as diagrammatically illustrated in FIG. 1 is driven by any suitable type of driving assembly 4 which includes a suitable gear train arrangement for rotating the billet 4 at a rate of rotation that will permit threads or filaments of fluorocarbon resin to be cut from the billet as is more fully described hereinafter. Turning machines such as screw cutting engine lathes of this type are well known and easily purchaseable on the open market, therefore the turning machine 1 will not be described in great detail herein.

Thus, in one form of screw cutting engine lathe for use in connection with the present invention, a lead screw attachment generally designated 5 is provided as shown in FIG. 1. Lead screw attachment 5 includes, a tool holder support 6 mounted for longitudinal movement along the bed 7 of the screw cutting engine lathe 1. The tool holder support 6 is operatively associated with an elongated threaded shaft or lead screw 6a mounted on the lathe 1 parallel to the longitudinal axis of the head of the lathe and the fixed axis of rotation for the chuck assembly 2. Fixedly connected and movable with the tool holder support 6, is a tool holder assembly 8 which includes, a tool support 9 having a slot 10 therethrough in which a cutting tool 11 can be mounted and locked in assembled position by any suitable threaded means such as the bolt 12. Thus when the tool holder support 6 and the tool holder assembly 8 are moved by the threaded shaft or lead screw 6a, the cutting tool 11 hereinafter more fully described will be moved longitudinally and parallel to the axis of rotation for the chuck 2 and billet 3 therein and can be so adjusted that it will commence initial cutting engagement with the peripheral surface of the billet 3 adjacent to the free end as is shown in FIGS. 1, 3 and 4 of the drawings.

The threaded shaft 6a is rotatably mounted in spaced bearings, not shown, in the turning lathe 1 and is driven by a suitable driving means generally designated 13 which is connected to the threaded shaft 6a by any suitable type of reduction gears generally designated 14 so that the rate of rotation of the threaded shaft 6a can be synchronized with the rate of rotation of the chuck assembly 2 and billet 3 of flurocarbon resin material.

Lead screw attachments for moving tool holder assemblies and the driving means for such lead screw attachment are well known in the art, easily purchaseable on the open market and therefore are not more fully described herein.

Alternatively, the operation of the threaded shaft 6a, driving means 13 and reduction gears 14 may be controlled by any suitable type of micro-processor generally designated 15 so that the rate of rotation of the threaded shaft 6a and therefore the longitudinal movement of the tool holder assembly 8 can either be constant or can be varied during operation.

The cutting tool 11 is particularly designed and assembled on the tool holder 9 so that it can be moved into position to cut from the billet 3 simultaneously a plurality of elongated threads or filaments 20a, 20b, 20c, 20d, and 20e, as is shown in FIGS. 3 and 4 of the drawings.

In order to achieve this advantageous result the cutting tool 11 as shown in FIGS. 1 to 9 of the drawings is an elongated member generally square or rectangular in cross-section. The cutting tool 11 is provided at one end with an offset cutting face generally designated 21 to form a plurality of offset or stepped cutting edges as at 22a, 22b, 22c, 22d and 22e shown in FIGS. 3 to 9 of the drawings.

Each of the cutting edges 22a to 22e are spaced from the next adjacent cutting edge a predetermined distance as represented by the offsets as at 23a, 23b, 23c and 23d.

The length of the cutting edges 22a to 22e, are shown as A in FIG. 4. This distance A determines one dimension A of the filament cross-section as shown at FIG. 4A, and is fixed for a given cutting tool. If a different dimension A is required, a new tool must be produced.

The length of the offsets, 23a to 23e, are shown as B in FIG. 4. This distance B, determines the maximum value for dimension B of the filament cross-section as shown in FIG. 4A. The actual value of dimension B for a given filament in turn is determined by the setting of the longitudinal feed rate, that is, the advance of the tool per revolution of the billet. A filament therefor may have a dimension B anywhere between zero and the length of offset 23a to 23e depending on the setting of the longitudinal feed rate.

FIG. 9 is a top view of a typical cutting tool with dimensions as shown. The dimension A for the filament as shown in FIG. 4A produced by this tool is determined by the length of the cutting edges, 22a to 22e, in this case 0.005". The length of the offsets, 23a to 23e is 0.015". Therefore as shown by FIG. 4A the dimension B of the filament produced by this tool can be anywhere between almost zero and b 0.015" depending upon the setting of the longitudinal feed rate.

Thus, for a given cutting tool by varying the length of the cutting edges 22b to 22e, and the offsets, 23a to 23d, and by controlling the longitudinal feed rate, elongated fibers or filaments with cross-sectional dimensions in a range from 0.002"×0.002" to 0.100"×0.100" can be easily achieved.

Further the number of cutting edges and offsets on the cutting tool is determined by the desired denier of the fiber bundle or yarn which is formed from the individual elongated threads or filaments after they are cut. Denier is the weight in grams of 9000 meters of a given yarn so formed.

Thus with a given cutting tool, for example the cutting tool 11 as shown in FIGS. 1 to 9 of the drawings, various denier of a given yarn can be produced by either changing the longitudinal feed rate or by separating the filaments as they are being spooled.

The offset cutting face 21 of the cutting tool 11 can be varied to produce different quadralateral cross-sectional shapes for the elongated threads or filaments 20a to 20e cut from the billet 3.

Thus by reference to FIG. 10, a cutting tool 50 is shown having a cutting face generally designated 51 which has sloped cutting edges as at 52a, 52b, 52c and 52d and offsets as at 53a, 53b, and 53c. This cutting tool will produce an elongated thread or filament having a rhomboid shaped cross-section as is shown in enlarged form at FIG. 10A.

In FIG. 11 the cutting tool 60 has an offset cutting face generally designated 61 which has curved cutting edges as at 62a, 62b and 62c and offsets as at 63a, 63b, 63c and 63d. This cutting tool will produce an elongated thread or filament having a cross-sectional form in which two sides will be parallel and two sides will have a curved shape as is shown in the enlarged section at FIG. 11A of the drawings.

In FIG. 12 the cutting tool 70 has an offset cutting face generally designated 71 with unequal length cutting edges as at 72a, 72b, 72c and 72d and spaced offsets of equal length as at 73a, 73b and 73c. This tool would produce elongated filaments in which one dimension A as shown in FIGS. 12A, 12B, and 12c, will vary from filament to filament and the other dimension B as shown in FIGS. 12A, 12B and 12C will be constant and be determined by the longitudinal feed setting.

OPERATION

In operation the screw cutting engine lathe 1 is first assembled so that the billet 3 is mounted in the chuck assembly 2 and aligned to establish a fixed axis of rotation for the billet 3.

The tool 11 is positioned in the opening 10 so that the longitudinal line thereof will intersect the center line of the axis of rotation for the billet 3 when the lead screw assembly 5 causes the tool holder assembly 8 to move the tool 11 into engagement with the end face 3a of the billet 3.

The motor 13 is placed into operation so that the motor 13 and gear train 14 will drive the threaded member 6 to cause the tool holder assembly 8 to move the cutting tool 11 into engagement with the billet 3.

As the cutting edges 22a to 22e and 23a to 23d enter into engagement with the end of the billet 3 the cutting tool will commence cutting the threads or filaments 20a20b, 20c, 20d and 20e from the face of the billet 3 each thread or filament being removed simultaneously intact and serially from the billet 3.

As long as the billet 3 rotates and the movement of the cutting edges are synchronized with such rotation, the individual threads or filaments 20a to 20e will be removed continuously and will have an indefinite length sufficient to enable the threads to be taken off singly or wound together to form a multi-filament yarn of predetermined denier as a function of the dimensions A and B which are established by the cutting tool and the longitudinal movement thereof.

Those skilled in the art will readily understand that the yarn thus formed can be subjected to additional treatment such as calendering or stretching at ambient temperature, at below ambient temperature or at elevated temperatures to orient the fibers, and thus increase the tensile strength of the yarn formed from the elongated threads or filaments 20a to 20e, which techniques are well known in the art.

Because cutting conditions by the method and apparatus above described are not ideal, the physical properties such as the tensile strength are affected by the surface speed of the billet. Thus if a certain critical surface speed for a given cross-sectional area of the elongated thread or filament being formed is exceeded, the elongated thread or filament being produced will contain minute fractures which reduces the tensile strength and the degree of elongation for the particular elongated thread or filament.

In the operation of the method and apparatus as above described, it has been determined that the smaller the cross-sectional area of the elongated thread or filament being formed, the higher the allowable surface speed for the billet of ductile material. Thus when making elongated threads or filaments having relatively small cross-sectional areas in the area of 0.002"×0.002" surface speeds as high as 500' per minute can be used. Conversely when making larger filaments in the order of 0.10"×0.010", the billet must be run at a lesser surface speed of about 200' per minute.

It is however possible to achieve higher surface speeds before fracturing occurs during the manufacture of elongated threads or filaments which have relatively larger cross-sectional areas by modifying the cutting edge of the cutting tool as is shown in FIGS. 13 to 16 of the drawing. Thus in FIG. 13 and 14, the cutting tool 80 is shown as having an offset cutting face 81 wherein the cutting edges are at 82a, 82b, 82c, 82d and 82e and the offsets are at 83a, 83b, 83c and 83d. Additionally, the top face of the cutting tool 80 will be angled as at 84a, 84b, 84c, 84d and 84e.

FIG. 16, the perspective view clearly shows how the top surface of the cutting tool 11 adjacent the cutting edges is modified or cut back by the grooves 84a, 84b, 84c, 84d and 84e at an angle to provide a positive top rake. This acts to reduce the forces exerted during cutting of the billet 3 and allows a higher cutting speed to be used before surface fracturing of the filament occurs.

ANOTHER EMBODIMENT OF THE INVENTION

In FIGS. 17 and 18 another embodiment of the invention is shown in which spaced tool holders are provided as at 9' and 9" in which cutting tools 11' and 11" respectively are mounted in the same manner above described for the cutting tool 11.

The cutting tools 11' and 11" may be identical with any of the cutting tools shown in FIGS. 4, 10, 11, 12, and 13 described above. Similarly the transverse cutting faces and the longitudinal movement of the cutting tool 11' and 11" will also be identical with the transverse cutting faces above described for the cutting tools 11, 50, 60, 70 and 80 described above.

In this arrangement the multiplicity of cutting tools can be used to produce more then one bundle of yarn with each longitudinal pass of the spaced cutting tool across the billet 3.

Thus a relatively simple mechanical means for forming a plurality of elongated threads or filaments has been described. These threads and filaments can be formed into yarns of predetermined denier which can be effectively utilized for the formation of products for which the characteristics of synthetic material such as fluorocarbon resins are readily adaptable.

It will be understood that the invention is not to be limited to the specific construction or arrangement of parts shown but that they may be widely modified within the invention defined by the claims.

What is claimed is:

1. Apparatus for forming elongated threads or filaments of synthetic material such as fluorocarbon resin from a billet thereof comprising:
   a. a chuck assembly mounted for rotation in said apparatus about a fixed axis,
   b. driving means for rotating the chuck assembly about said fixed axis,
   c. at least one sized billet of ductile material fixedly mounted on said chuck assembly for rotation therewith when the driving means is placed in operation,
   d. a tool holder assembly operatively connected on the apparatus for longitudinal movement,
   e. means for moving the tool holder assembly at a predetermined rate parallel to the axis of rotation of the chuck assembly and the billet connected thereto,
   f. a cutting tool fixedly mounted on and movable with the tool holder assembly parallel to the axis of rotation of the chuck assembly and movable with respect to the tool holder toward and away from the axis of rotation of said billet to engage and cut into said billet when the same is rotated with the chuck assembly, and
   g. said cutting tool having shaped transverse cutting face means, with at least two shaped cutting edges and at least two offsets which space said cutting edges, for simulataneously cutting at least two sized and shaped threads and filaments in elongated form from the billet corresponding to the at least two shaped cutting edges.

2. In the apparatus as claimed in claim 1 wherein:
   a. the shaped cutting edges on the end cutting face of the cutting tool are parallel to the longitudinal line of the cutting tool and have a predetermined length to form one of the dimensions for threads and filaments generally square and rectangular in cross-section, and
   b. said offsets on the end cutting face are transverse to the longitudinal line of the cutting tool and have a predetermined length for forming the other dimension for threads or filaments generally square and rectangular in cross-section as a function of the predetermined rate of longitudinal movement of the tool holder assembly.

3. In the apparatus as claimed in claim 1 wherein;
   a. the shaped cutting edges on the end cutting face of the cutting tool are sloped at an angle to the longitudinal line of the cutting tool and have a predetermined length to form one of the dimensions for threads and filaments generally rhomboid in cross-section, and
   b. said offsets on the end cutting face are transverse to the longitudinal line of the cutting tool and have a predetermined length to form the other dimensions for threads or filaments generally rhomboid in cross-section as a function of the predetermined rate of longitudinal movement of the tool holder assembly.

4. In the apparatus as claimed in claim 1 wherein;
   a. the shaped edges on the end cutting face of the cutting tool are curved and have a predetermined length to form one of the dimensions for threads or filaments having at least one curved side in cross-section, and
   b. said offsets on the end cutting face are transverse to the longitudinal line of the cutting tool and have a predetermined length for forming the other dimensions for threads or filaments generally having one curved side in cross-section as a function of the predetermined rate of longitudinal movement of the tool holder assembly.

5. In the apparatus as claimed in claim 1 wherein;
   a. the shaped cutting edges on the end cutting face of the cutting tool are parallel to the longitudinal line of the cutting tool and each have a different predetermined length than the next adjacent shaped cutting edge to form different lengths of one of the dimensions for threads or filaments generally rectangular in cross-section, and
   b. said offsets on the end cutting face are transverse to the longitudinal line of the cutting tool and have a predetermined length to form the other dimension for the respective threads or filaments generally rectangular in cross-section as a function of the predetermined rate of longitudinal movement of the tool holder assembly.

6. In the apparatus as claimed in any of claims 2, 3, 4 or 5 wherein;
   a. said cutting edges have a predetermined length to cut one of said dimensions of the cross-sectional shape of the threads and filaments in a range from 0.001" to 0.100", and
   b. said offsets have a length so that the predetermined longitudinal movement will cut the second dimension in a range from 0.001" to 0.100".

7. In the apparatus as claimed in claim 1 wherein the ductile material is a synthetic resin from the group of fluorocarbon resins, namely polytetrafluoroethylene, fluoroethylene propylene and like polymers and copolymers thereof.

8. In the apparatus as claimed in claim 1 including, a micro-processor for controlling the longitudinal movement of the tool holder assembly and for synchronizing the same with the rotation of the chuck assembly and billet to produce a predetermined cross-sectional size for the elongated thread and filament cut from the billet by the cutting tool.

9. In the apparatus as claimed in claim 1 wherein;
   a. the tool holder assembly operatively connected in the turning machine has at least two spaced cutting tool holders thereon, and
   b. a cutting tool respectively mounted in each of said cutting tool holders, and
   c. each of said tool holders having an end cutting face sized and shaped to cut the elongated threads and filaments to a given shape in cross-section, each end cutting face including at least two shaped cutting edges and at least two offsets which space the respective cutting edges, each end cutting face simultaneously cutting at least two sized and shaped threads and filaments in elongated form from the billet.

10. In the apparatus as claimed in claim 9 wherein;
    a. at least one of said cutting tools has an end cutting face shaped to cut filaments generally square in cross-sectiion.

11. In the apparatus as claimed in claim 9 wherein, at least one of said cutting tools has, a transverse cutting face shaped to cut the elongated threads and filaments generally rhomboid in cross-section.

12. In the apparatus as claimed in claim 9 wherein at least one of said cutting tools have an end cutting face shaped to cut elongated threads and filaments having one side curved in cross-section.

13. In the apparatus as claimed in claim 9 wherein at least one of said cutting tools have, an end cutting face with cutting edges therein having different lengths whereby the adjacent elongated threads and filaments cut by said at least one cutting tool will have one of the dimensions different from the dimension of the next adjacent elongated thread or filament.

14. In the apparatus as claimed in claim 9 including, a micro-processor for controlling the longitudinal movement of the tool holder assembly and for synchronizing the same with the rotation of the chuck assembly and billet to produce a predetermined cross-sectional size for the elongated threads and filaments cut from the billet by the cutting tools on the spaced cutting tool holders.

15. A method of forming elongated threads and filaments from a billet of ductile synthetic material such as fluorocarbon resin comprising the steps of:
   a. mounting said billet of synthetic material for rotation about a fixed axis, and
   b. simultaneously cutting a plurality of shaped and sized elongated threads and filaments from the billet including the steps of:
      (i) adjusting a cutting tool having a shaped transverse cutting face with a plurality of shaped and sized cutting edges and a plurality of offsets which space said cutting edges, in the radial direction with respect to said fixed axis, and
      (ii) moving said cutting tool in a longitudinal direction parallel to said fixed axis at a predetermined rate into contact with said billet such that said plurality of cutting edges simultaneously cut said plurality of shaped and sized elongated threads and filaments from the billet.

16. The method of forming elongated threads and filaments as claimed in claim 15 including the step of, varying the longitudinal movement of the cutting tool to provide threads and filaments of varying cross-sections.

17. The method of forming elongated threads and filaments as claimed in claim 15 including the steps of;
   a. shaping and sizing the cutting edges of the cutting tool to provide elongated threads and filaments generally square in cross-section.

18. The method of forming elongated threads and filaments as claimed in claim 15 including the steps of;
   a. shaping and sizing the cutting edges of the cutting tool to provide elongated threads and filaments generally square in cross-section,
   b. the cross-sections so formed having a length dimension in a range from 0.001" to 0.100", and
   c. so synchronizing and controlling the longitudinal movement of the cutting tool to provide a width dimension in a range from 0.001" to 0.100".

19. The method of forming elongated fibers and filaments as claimed in claim 15 including the steps of, shaping and sizing the cutting edges of the cutting tools to provide elongated threads and filaments generally rhomboid in cross-section.

20. The method of forming elongated fibers and filaments as claimed in claim 15 including the steps of, shaping and sizing the cutting edges of the cutting tools to provide elongated threads and filaments having a quadralateral cross-section with at least one curved side.

21. In the apparatus as claimed in claim 1, wherein said at least two cutting edges are offset from each other in a direction substantially perpendicular to said axis of rotation to form stepped cutting edges.

* * * * *